Aug. 23, 1966  A. J. WILLIAMS  3,267,966
REGENERATIVE FLUID PRESSURE CONTROL VALVES
Filed Oct. 11, 1963

INVENTOR
Arthur J. Williams his attorneys

United States Patent Office 3,267,966
Patented August 23, 1966

3,267,966
REGENERATIVE FLUID PRESSURE
CONTROL VALVES
Arthur J. Williams, Hubbard, Ohio, assignor to Commercial Shearing & Stamping Company, a corporation of Ohio
Filed Oct. 11, 1963, Ser. No. 315,561
6 Claims. (Cl. 137—625.69)

This invention relates to regenerative valves and particularly to a valve capable of operating in parallel with other valves of the same general type in conventional power up, power down and regenerative down cycles.

There are many occasions in the operation of double acting hydraulic cylinders when it is desirable to move the cylinder at an accelerated rate. For example, it is often desirable to lower the bucket of a hi-lift at an accelerated rate without cavitation and under complete control. Various valves have been heretofore proposed for accomplishing a similar result but the necessary versatility is lacking in all such valves of which I have knowledge. Since valves of this type are particularly useful in earth moving machinery, I shall describe the valve in connection with raising and lowering of a load such as in a high lift.

I provide a series parallel valve which is effective to provide a neutral position, power-up power down and regenerative positions in a single compact unit. In a preferred embodiment I provide a housing having a bore extending therethrough and open at each end to receive an elongated spool valve element, a fluid inlet in said housing extending transverse to said bore and intersecting the bore intermediate its ends, a fluid outlet in said housing extending transversely of said bore and intersecting the bore at a point adjacent to but spaced from the intersection of the inlet passage, a parallel fluid inlet in the housing spaced from the fluid inlet and adapted with the fluid inlet to receive high pressure fluid from a source of fluid under pressure, a valve element slidable in said bore, a pair of high pressure outlets intersecting the bore one on either side of the said fluid inlet and outlet, a pair of exhaust outlets in the housing intersecting the bore on either side of the fluid inlet and outlet and passage means communicating between the parallel fluid inlet and the bore adjacent each of the high pressure outlets, said valve element having a neutral position in which fluid passes directly through the fluid inlet and the bore into the fluid outlet, a power position for each high pressure outlet which directs fluid from the parallel fluid inlet through the said passage means to one high pressure outlet while directing fluid from the other high pressure outlet to an exhaust outlet and a second power position for one of said high pressure outlets in which fluid from the parallel inlet is directed through the passage means into said one high pressure outlet and simultaneous by directing fluid from the other high pressure outlet into the said passage means to supplement the fluid entering the parallel fluid inlet and going to said one high pressure outlet. Preferably the said other transverse bore is connected to the said passage means by a check valve restricting the direction of flow in said passage means.

In the foregoing general description, I have set out certain problems of the prior art and certain objects, advantages and purposes of my invention. Other objects, advantages and purposes will be apparent from a consideration of the following description and the accompanying drawings in which, FIGURE 1 is a vertical section through a preferred form of valve according to this invention with the valve element in the neutral position;

Figure 1:
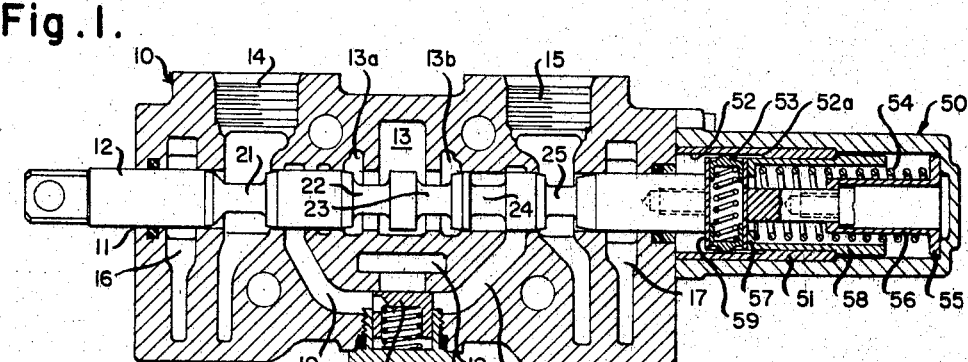

Referring to the drawings, I have illustrated a valve having a body or housing 10 provided with a longitudinal bore 11 open at each end and carrying a valve element 12 shiftable in said bore 11. The housing 10 is provided with a transverse inlet bore 13 which intersects bore 11 intermediate its ends and is designed to receive and carry high pressure fluid from a pump or the like into the housing for discharge to a next adjacent valve or to reservoir through outlet bores 13a at 13b. High pressure outlet ports 14 and 15 are provided in the body, one on each side of and spaced from the transverse inlet bore 13 and outlet bore 13a and intersecting bore 11. A pair of low pressure outlets 16 and 17 are provided in the body intersecting bore 11 adjacent each of ports 14 and 15. A second transverse inlet bore 18 adapted to receive fluid from the same high pressure source as bore 13 is provided in the body parallel to bore 13. The bore 18 is connected to bore 11 at spaced apart points on opposite sides of bore 13 by passage 19, preferably through a check valve 20. The valve element 12 is provided with spaced grooves 21, 22, 23, 24 and 25 along its length whose function will be hereafter more fully described.

Referring to FIGURE 1, I have illustrated the preferred embodiment of my valve in the neutral position. In this position high pressure fluid passes directly through the valve body by way of bores 13 and 13a and 13b through grooves 22 and 23 and fills bore 18 with high pressure fluid. No fluid flows to high pressure ports 14 and 15.

Figure 2:
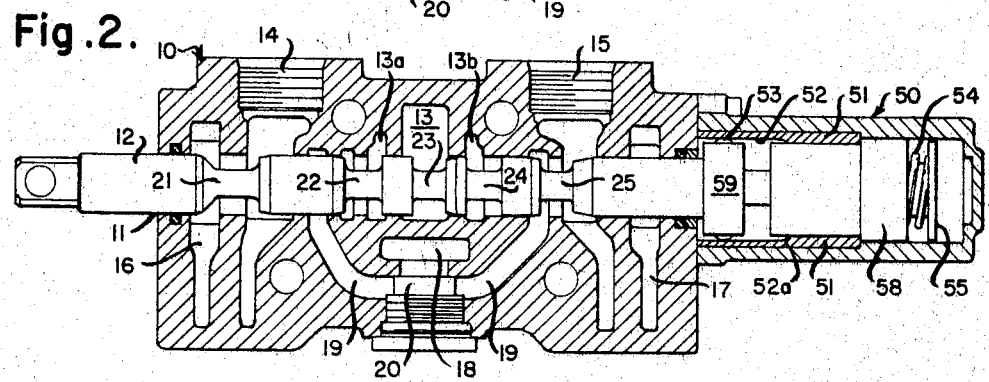
FIGURE 2 is a section identical with FIGURE 1 with the valve element in the raised position for lifting a load.

In FIGURE 2, I have illustrated the valve in position to lift a load. In this position high pressure fluid is prevented from passing through the bore 13 by the lands on each side of groove 23. High pressure fluid in bore 18 passes through check valve 20 into passageway 19 from which it goes by way of groove 25 to high pressure outlet 15 and from there to one side of a double acting lift cylinder (not shown) as for example on a high lift to raise the bucket (not shown). Fluid from the opposite side of the lift cylinder returns through outlet port 14, through groove 21 to outlet port 16.

Figure 3:
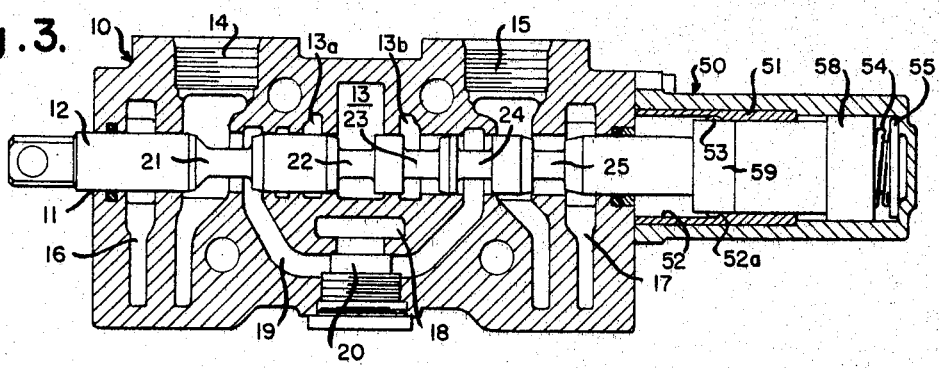
FIGURE 3 is a section identical with FIGURE 1 with the valve element in the lower position for lowering a load.

In FIGURE 3, I have illustrated the valve in position to lower a load in conventional manner. Here fluid entering bore 13 is blocked by the lands on either side of groove 22 but fluid in bore 18 passes through check valve 20 passage 19 and groove 21 to the lift cylinder by way of high pressure port 14. Fluid returned from the lift side of the lift cylinder passes into high pressure port 15, through groove 25 to outlet port 17.

Figure 4:
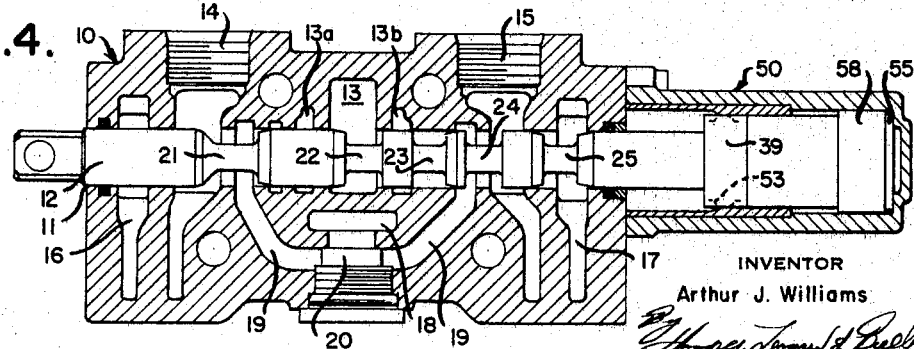
FIGURE 4 is a section identical with FIGURE 1 with the valve element in the regenerative lower position for rapidly lowering a load without cavitation.

The regenerative position shown in FIGURE 4 prevents the flow of fluid through bore 13 by reason of lands on opposite sides of groove 22 as in the case of FIGURE 3 however the valve element has been shifted to the right viewing the figures, so that high pressure fluid in bore 18 passes through check valve 20 to passage 19, high pressure port 14 and into the lift cylinder. At the same time fluid returning from the lift side of the hydraulic cylinder enters high pressure port 15, through groove 24 into passage 19 and is combined with the fluid from bore 18 entering port 14. This supply of additional fluid under pressure causes the cylinder to lower rapidly under power without any danger of cavitation and permits rapid, accurate movement of the lift without jerking or lagging.

A self-centering mechanism 50 is attached to the valve element 12 to return it to the neutral position. This self-centering mechanism is made up of outer sleeve 51 having opposed detent grooves 52 receiving the two ends of spring loaded poppets or detents 53 adjacent the end of valve element 12 which slide therein. Movement of the valve element 12 to the "raise" position compresses spring 54 between shoulder 55 on the end of sleeve cup 56 which is slidable on the end of the valve element and shoulder 57 on sleeve 58. When the valve element actuator lever (not shown) is released the spring returns the valve element to neutral. When the valve element is moved to normal "lower" position, the spring 54 is compressed between shoulder 55 and shoulder 57 as the detent carrier 59 forces the sleeve 58 toward shoulder 55. When the valve element actuator lever is released the spring 54 returns the valve element to neutral. In the case of regenerative "lower" to compression of spring 54 is continued by moving valve element 12 to force the detents 53 to leave grooves 52 by forcing them over stop 52a. Release of the valve actuator lever permits spring 54 to return the valve element 12 to neutral.

In the foregoing description and in the drawings, I have illustrated and described a present preferred embodiment of this invention. It will be understood, however, that this invention may be otherwise embodied within the scope of the following claims.

I claim:

1. In a control valve, a housing having a bore extending therethrough and open at each end to receive an elongated spool valve element, a fluid inlet in said housing extending transverse to said bore and intersecting the bore intermediate its ends, a fluid outlet in said housing extending transversely of said bore and intersecting the bore at a point adjacent to but spaced from the intersection of the inlet passage, a parallel fluid inlet in the housing spaced from the fluid inlet and adapted with the fluid inlet to receive high pressure fluid from a source of fluid under pressure, a valve element slidable in said bore, a pair of high pressure outlets intersecting the bore one on either side of the said fluid inlet and outlet, a pair of exhaust outlets in the housing intersecting the bore on either side of the fluid inlet and outlet and passage means communicating between the parallel fluid inlet and the bore adjacent each of the high pressure outlets, said valve element having a neutral position in which fluid passes directly through the fluid inlet and the bore into the fluid outlet, a power position for each high pressure outlet which directs fluid from the parallel fluid inlet through the said passage means to one high pressure outlet while directing fluid from the other high pressure outlet to an exhaust outlet and a second power position for one of said high pressure outlets in which fluid from the parallel inlet is directed through the passage means into said one high pressure outlet and simultaneously directing fluid from the other high pressure outlet into the said passage means to supplement the fluid entering the parallel fluid inlet and going to said one high pressure outlet.

2. In a control valve, a housing having a bore extending therethrough and open at each end to receive an elongated spool valve element, a fluid inelt in said housing extending transverse to said bore and intersecting the bore intermediate its ends, a fluid outlet in said housing extending transversely of said bore and intersecting the bore at a point adjacent to but spaced from the intersection of the inlet passage, a parallel fluid inlet in the housing spaced from the fluid inlet and adapted with the fluid inlet to receive high pressure fluid from a source of fluid under pressure, a valve element slidable in said bore, a pair of high pressure outlets intersecting the bore one on either side of the said fluid inlet and outlet, a pair of exhaust outlets in the housing intersecting the bore, one adjacent each of the high pressure outlets, and passage means communicating between the parallel fluid inlet and the bore adjacent each of the high pressure outlets, said valve element being shiftable in opposite directions longitudinally of the bore from a neutral position in which fluid passes directly through the fluid inlet and the bore into the fluid outlet to a power position on one side of the neutral position in which fluid is directed from the parallel fluid inlet through the said passage means to one high pressure outlet while directing fluid from the other high pressure outlet to the exhaust outlet adjacent it and to a pair of successive power positions on the opposite side of the neutral position, the first of which directs fluid from the parallel fluid inlet through the passage means to the other high pressure outlet while directing fluid from the said one high pressure outlet to the exhaust outlet adjacent it and the second, most remote from the neutral position, which directs fluid from the parallel inlet through the passage means into said other high pressure outlet and simultaneously directs fluid from said one high pressure outlet into the said passage means to supplement the fluid entering the parallel fluid inlet and going to said other high pressure outlet.

3. A control valve as claimed in claim 2 wherein said valve element is provided with self center means comprising a first movable sleeve surrounding the valve element and normally abutting a fixed member on the housing, a radially inwardly directed shoulder on said sleeve at the end abutting the fixed member, a second movable sleeve surrounding the valve element and movable within the first movable sleeve, said second sleeve abutting a second fixed member on the housing and provided with a radially outwardly extending shoulder at the abutting end, a spring between the shoulders on said sleeves, spaced stops on the end of the valve element normally contacting both sleeves in the neutral position and urging one sleeve toward the other to compress the spring when said element is moved in either direction from neutral, thereby biasing the valve element to return to its neutral position.

4. In a control valve, a housing having a bore extending therethrough and open at each end to receive an elongated spool valve element, a fluid inlet in said housing extending transverse to said bore and intersecting the bore intermediate its ends, a fluid outlet in said housing extending transversely of said bore and intersecting the bore at a point adjacent to but spaced from the intersection of the inlet passage, a parallel fluid inlet in the housing spaced from the fluid inlet and adapted with the fluid inlet to receive high pressure fluid from a source of a fluid under pressure, a valve element slidable in said bore, a pair of high pressure outlets intersecting the bore one on either side of the said fluid inlet and outlet, a pair of exhaust outlets in the housing intersecting the bore on opposite sides of the high pressure outlets from the fluid inlet and outlet and passage means communicating between the parallel fluid inlet and the bore adjacent each of the high pressure outlets between said outlets and the fluid inlet and outlet, said valve element having a neutral postion in which fluid passes directly through the fluid inet and the bore into the fluid outlet, a power position for each high pressure outlet which directs fluid from the parallel fluid inlet through the said passage means to one high pressure outlet while directing fluid from the other high pressure outlet to an exhaust outlet and a second power position for one of said high pressure outlets in which fluid from the parallel inlet is directed through the passage means into said one high pressure outlet and simultaneously directing fluid from the other high pressure outlet into the said passage means to supplement the fluid entering the parallel fluid inlet and going to said one high pressure outlet.

5. A control valve as claimed in claim 4 wherein the parallel fluid inlet communicates with the passageway intermediate its ends through a check valve.

6. In a regenerative control valve, a valve body having an elongated bore, a pair of high pressure outlets spaced apart and communicating with said bore, exhaust passage means adjacent the high pressure outlets and communicating through said bore with the adjacent high pressure outlets, a valve element in said bore movable axially thereof from a neutral position to any of three operative positions, to govern selectively communication between the exhaust passage means and the high pressure outlets, an inlet and an outlet intersecting said bore through which pressure fluid flows in the neutral position, but is blocked in the three operative positions, a parallel inlet passage in the body receiving pressure fluid supplied to the body inlet, said valve elements having three operative positions including a power position on one side of the neutral position in which fluid is directed from the parallel fluid inlet through passage means communicating with the bore adjacent one of the high pressure outlets and through the bore to said adjacent outlet while fluid is returned through the other outlet to the bore and discharged through the bore to the adjacent exhaust passage means, a like power position on the other side of neutral and a second power position on said other side of neutral in which fluid from the parallel inlet is directed through the passage means into said one high pressure outlet and simultaneously directing fluid from the other high pressure outlet into the said passage means to supplement the fluid entering the parallel fluid inlet and going to said one high pressure outlet.

References Cited by the Examiner

UNITED STATES PATENTS 2,486,087  7/1943  Wright.

WILLIAM F. O'DEA, *Primary Examiner.*

H. COHN, *Assistant Examiner.*